No. 870,856. PATENTED NOV. 12, 1907.
W. W. TAVERNER & A. GREGG.
POTATO PLANTER.
APPLICATION FILED APR. 3, 1907.
2 SHEETS—SHEET 1.
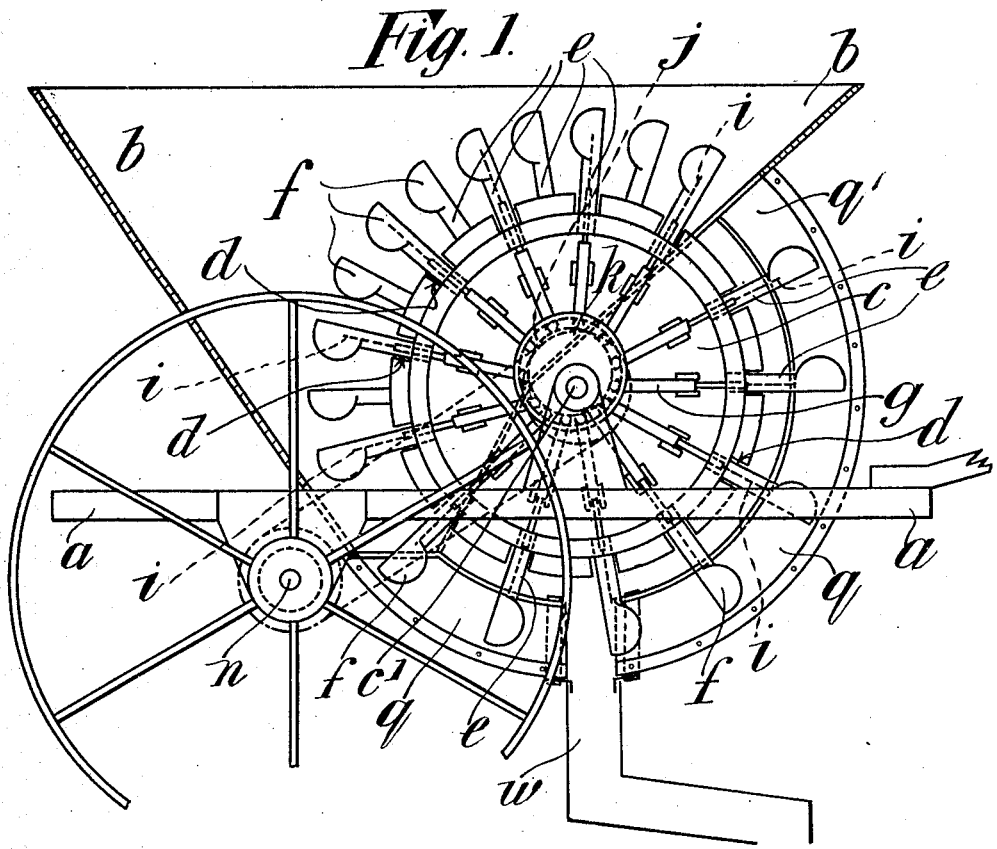
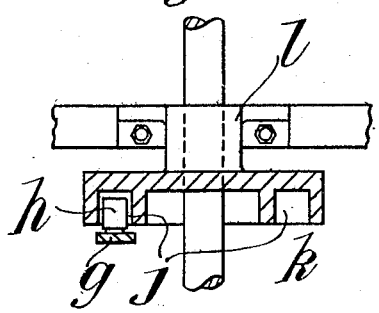
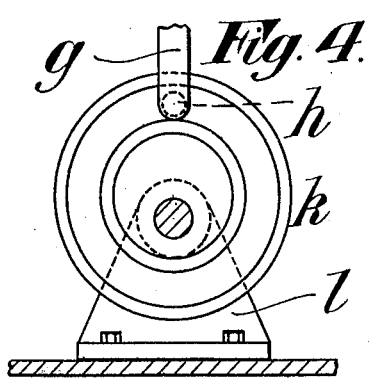

No. 870,856. PATENTED NOV. 12, 1907.
W. W. TAVERNER & A. GREGG.
POTATO PLANTER.
APPLICATION FILED APR. 3, 1907.
2 SHEETS—SHEET 2.
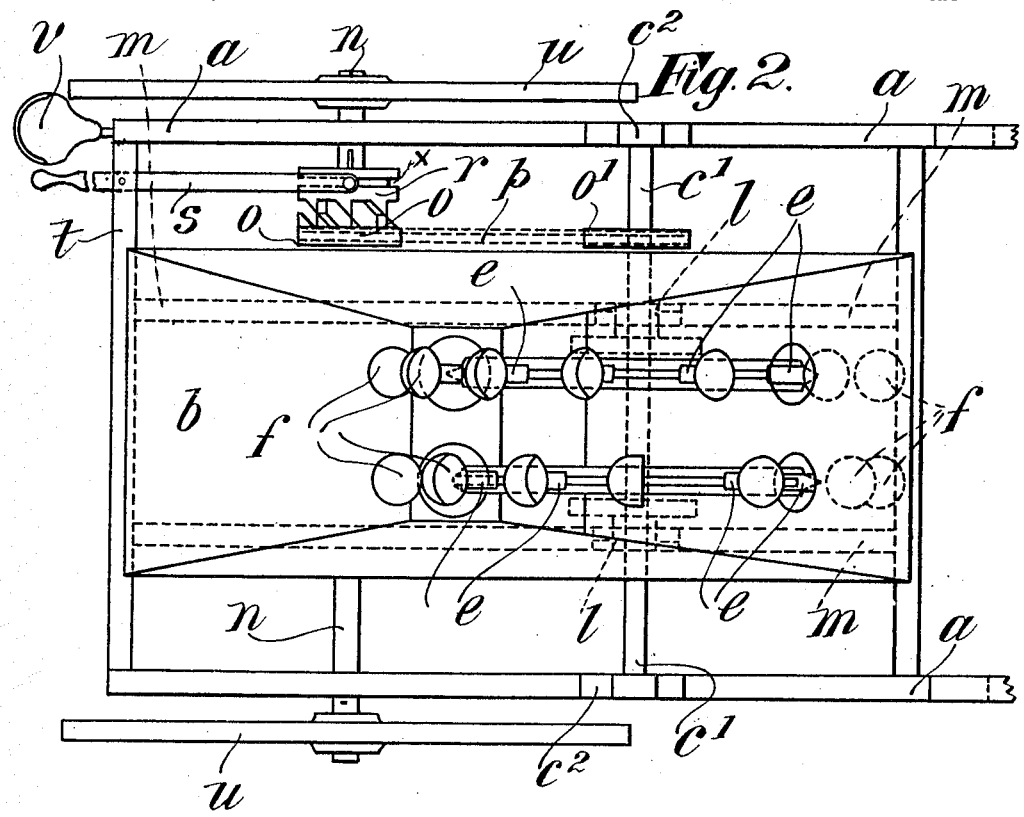
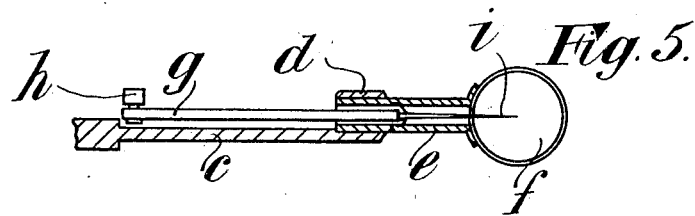
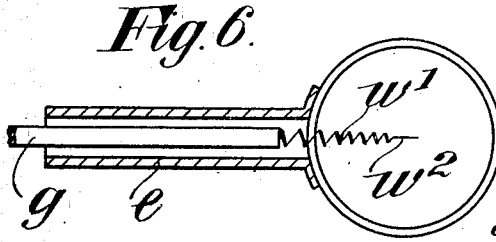
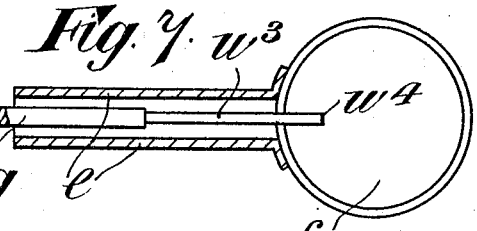
Witnesses:
P. F. Nagle.
L. Douville.
Inventor:
By William White Taverner.
Arthur Gregg.
Biedersheim & Fairbanks.
Attorneys.

UNITED STATES PATENT OFFICE.

WILLIAM WHITE TAVERNER, OF UPPER BALLINDERRY, AND ARTHUR GREGG, OF BELFAST, IRELAND.

POTATO-PLANTER.

No. 870,856.  Specification of Letters Patent.  Patented Nov. 12, 1907.

Application filed April 3, 1907. Serial No. 366,073.

*To all whom it may concern:*

Be it known that we, WILLIAM WHITE TAVERNER, of Upper Ballinderry, County Antrim, Ireland, farmer, and ARTHUR GREGG, of 32 Exchange street, Belfast, County Antrim, Ireland, timber merchant, have invented certain new and useful Improvements in Potato-Planters, of which the following is a specification.

This invention relates to potato planters and it has for its object to improve their construction.

Under this invention the potatoes are lifted out of a hopper by means of a series of cups each cup being fitted on the end of a radial rod carried on the outer surface of a rim or wheel and each rod having an arm provided at its outer end with a needle or point and at its inner end engaging with a groove in a stationary cam by the action of which the needle or point is caused to retain the potato in the cup for a certain time and then subsequently release the same.

In order that our said invention may be clearly understood, reference may be had to the accompanying drawing.

Figure 1 is a side view of part of a potato planting machine and is drawn partly in elevation and partly in section. Fig. 2 is a plan view of same. Figs. 3 and 4 are detail views of the cam for operating the rods $g$ and their retaining needles $i$. Fig. 5 is a sectional view showing a cup, a retaining needle and its operating rod. Fig. 6 is a sectional view of a modified device for retaining a potato in its cup. Fig. 7 is a sectional view of a second modification.

On the drawings the same reference letters wherever repeated indicate the same parts.

In carrying out our invention the framework $a$ of the machine is made of any suitable shape and construction and carried thereon is a potato hopper $b$ through which works an arrangement for lifting the potatoes from the hopper one by one and thereafter dropping them in succession on to the ground. This arrangement comprises one, or, if desired two (or more) revoluble wheels $c, c$, keyed on a shaft $c^1$ supported in bearings $c^2, c^2$, and $l, l$. These wheels have square holes $d$ in their rims and into these holes are inserted hollow rods or tubes $e$ carrying cups $f$. Through the hollow rods or tubes $e$ pass rods $g$ having at their inner ends rollers $h$ and carrying needles $i$ at their outer ends. The rods $g$ work between guide pieces $g^1, g^1$, cast on the sides of the wheels $c, c$. The rollers $h$ bear in the grooves $j$ of two stationary cams $k$ cast in one with the bearings $l$ which latter are secured to the longitudinal members $m, m$, of the framework $a$.

The wheels $c, c$, are rotated from the main axle or shaft $n$ by means of sprocket wheels $o, o^1$, and chain $p$. The rods $g$ carrying the needles $i$ rotating with the wheels $c, c$, about the stationary cams $k$ have thus imparted to them a reciprocating motion. The cams $k$ are so arranged that the needles $i$ begin their outward stroke shortly after the cups $f$ enter the hopper $b$. As the cups $f$ take up the potatoes, the latter are pierced by the needles $i$ and are retained in the cups until the rotation of the wheels $c, c$, reaches a desired point when the cups $f$ enter a pipe or chute $q$. At this point the needles $i$ are at the end of their inward stroke so that the potatoes are released and allowed to drop down the pipe and on to the ground. This arrangement permits of only one potato being retained and then dropped at any one time any others which may be picked up by the cups falling back into the hopper $b$.

The sprocket wheel $o$ is provided on its outer face with a claw clutch adapted to engage, when desired, with a sliding clutch $r$ on the main shaft $n$. The clutch $r$ is operated by means of a hand lever $s$ pivoted to the transverse member $t$ of the framework $a$.

$u, u$, are the vehicle wheels.

$v$ is a seat for the driver.

The pipe $q$ which is secured to the hopper $b$ is made in two parts bolted together, clearance being left between the inner edges of the halves for the passage of the guide tubes $e$ as they rotate with the wheels $c, c$. At the bottom of the pipe $q$ is a chute $w$ which can be moved to the right or left of its central position (according as the furrow in which the potatoes are being dropped is at one side or other) by means of a lever (not shown).

In the modification of potato retaining device shown at Fig. 6 the bar $g$ is provided at its outer end with a spring $w^1$ which may have, if desired, a small piercer $w^2$ at its free end.

The potato retaining device shown at Fig. 7 comprises the rod $g$ to which is secured a rod, pipe, or tube $w^3$ provided with a rubber or other resilient tip $w^4$ for frictionally holding the potato in the cup.

Arranged between the chute or pipe $q$ and the bottom of the hopper is a short length of pipe $q^1$ this short length $q^1$ preventing the potatoes falling out of the hopper as it is made just long enough to always have two cups in it, one leaving and one entering the pipe. If a potato slips by the first cup it is inevitably caught by the second.

When two potato lifting wheels are used they would preferably be arranged side by side as shown on the drawings.

The method of securing each potato in its cup by means of a piercing needle insures the lifting of one potato only by each cup and consequently the planting of a single potato at a time.

Having now fully described our invention what we claim and desire to secure by Letters Patent is:—

1. A potato planter having, in combination, a rotatable wheel with a series of cups thereon, a potato holder projecting into each cup and radially disposed on the wheel, means for guiding the said holders and a centrally situated cam for operating the holders.

2. A potato planter having, in combination, a rotatable wheel with a series of cups thereon, a potato holder projecting into each cup and radially disposed on the wheel, means for guiding the said holders and a centrally situated cam which is adapted to cause the holders to first retain the potatoes in the cups and then subsequently release the same.

3. A potato planter having, in combination, a wheel, a shaft, means for rotating the shaft, a series of cups radially disposed on the circumference of the wheel, a needle projecting into each cup, a rod connected with each needle and a stationary cam adapted to operate the rods and needles to cause the latter to first pierce the potato in the cup and then release the same.

4. A potato planter having, in combination, a wheel, a shaft, means for rotating the shaft, a series of cups radially disposed on the circumference of the wheel, a needle projecting into each cup, a rod connected with each needle, a roller on the inner end of the rod and a stationary grooved cam adapted to engage the said roller.

5. A potato planter having, in combination, a potato hopper, a wheel arranged at the bottom of the hopper, a shaft for rotating same, means for revolving the shaft, a series of cups radially disposed on the circumference of the wheel, a pipe connected with the hopper said pipe having an opening at its underside, a needle projecting into each cup, radially disposed rods for operating the needles and a fixed cam.

6. A potato planter having, in combination, a frame mounted on wheels, an axle for the wheels, a clutch on the axle, means for operating the clutch, a clutch wheel, a chain driven by the clutch wheel, a shaft driven by the chain, two wheels mounted on the shaft, a series of cups radially mounted on each wheel, needles projecting into the cups and a cam for operating the needles, said cam being fixed and centrally situated with reference to the cups.

In testimony whereof we affix our signatures in presence of two witnesses.

WILLIAM WHITE TAVERNER.
ARTHUR GREGG.

Witnesses:
H. PERCIVAL HARRIS,
JOSEPH McGUINNESS.